United States Patent [19]
McLean et al.

[11] Patent Number: 5,358,759
[45] Date of Patent: Oct. 25, 1994

[54] OPTICAL RECORDING ELEMENT

[75] Inventors: Robert A. McLean; Lynn Y. Dorey; Paul A. Hunt, all of Essex, England

[73] Assignee: Imperial Chemical Industries PLC, London, England

[21] Appl. No.: 897,464

[22] Filed: Jun. 11, 1992

[30] Foreign Application Priority Data

Jun. 11, 1991 [GB] United Kingdom ............. 9112567.4

[51] Int. Cl.[5] ............................................... B32B 3/00
[52] U.S. Cl. ......................................... 428/64; 428/65; 428/913; 430/945; 346/76 L; 346/135.1
[58] Field of Search ............... 428/64, 65, 457, 913; 346/76 L, 135.1; 430/945

[56] References Cited

U.S. PATENT DOCUMENTS 5,002,812  3/1991  Umehara et al. ................ 428/64

FOREIGN PATENT DOCUMENTS 103892  3/1984  European Pat. Off. .

OTHER PUBLICATIONS

M. C. Gupta and F. Strome, Erasable laser recording in an organic dye–binder optical disk medium, Journal of Applied Physics, 15 Oct. 1986, vol. 60. No. 8, pp. 2932–2937.
Patent Abstracts of Japan, vol. 14, No. 138 (P-1022) Mar. 1990 re JP-A-20 03 124.

*Primary Examiner*—Patrick J. Ryan
*Assistant Examiner*—Elizabeth Evans
*Attorney, Agent, or Firm*—Cushman, Darby & Cushman

[57] ABSTRACT

Data is written into thin overcoated optical recording media in such a way that pit formation is accompanied by breaching of the overcoat at least temporarily so as to release gases/vapors produced during pit formation. Improved jitter and CNR is obtained.

9 Claims, 3 Drawing Sheets

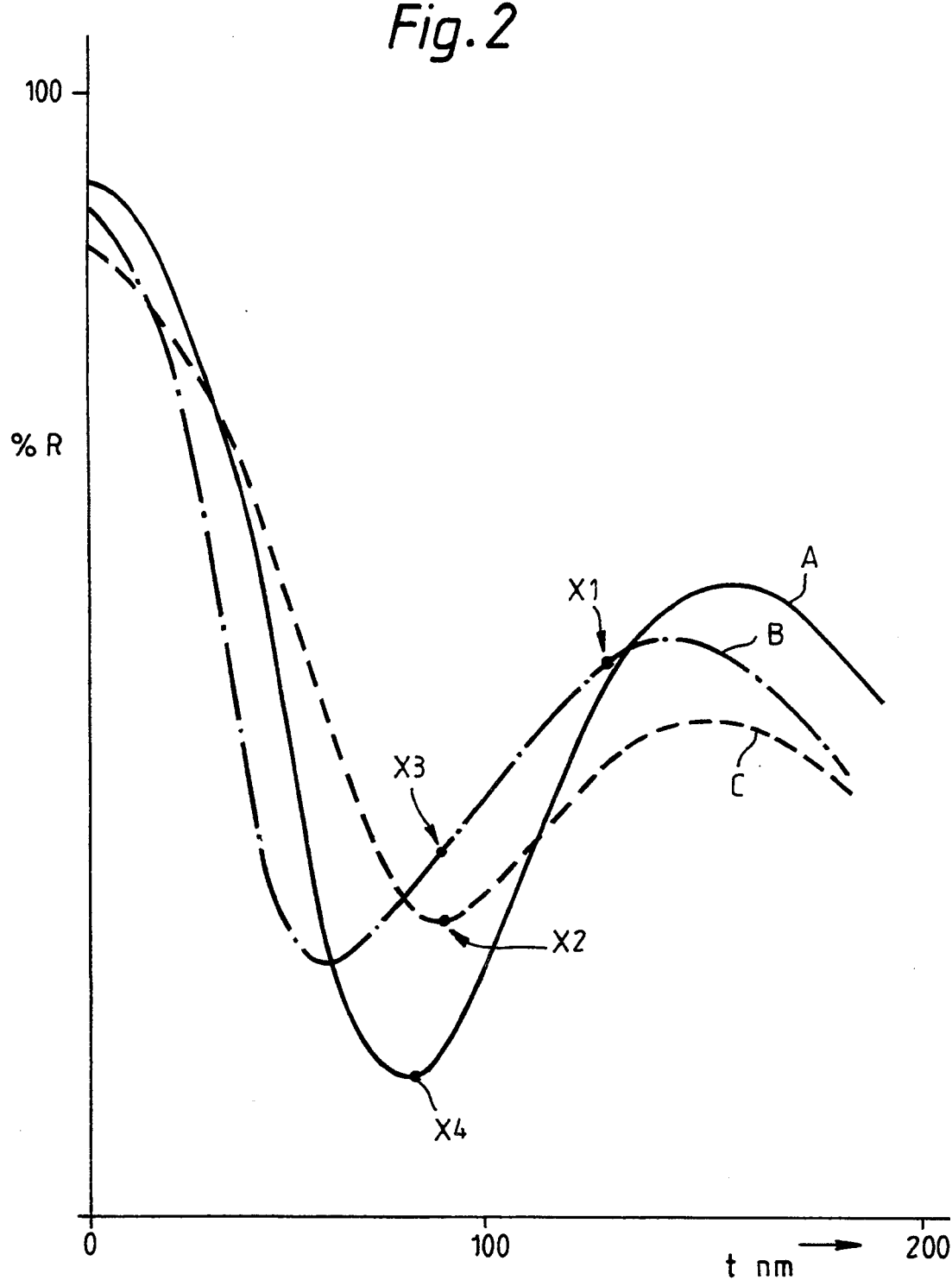

OPTICAL RECORDING ELEMENT

This invention relates to optical recording media of the type in which a recording layer of the medium is provided with an overlying overcoat layer. Typically, the overcoat layer has one or more functions such as: protection of the recording layer from abrasion/scratching and/or ensuring compatibility between opposite faces of the medium, particularly in the case where the medium is in the form of a tape which is to wound on to one or more spools so that there is contact between the opposite faces; and/or to afford barrier properties with respect to the environment.

The invention is particularly concerned with an optical recording medium in which information is written into the recording layer by a laser beam in the form of pits, the recording layer composition being such that it undergoes deformation and/or ablation when the laser beam interacts therewith after the laser beam has traversed the overcoat layer. In such media, in order to attain good sensitivity, the overcoat layer should be relatively thin (for example, less than 100 run). The conventional technique for effecting pit formation involves local softening of the overcoat, for example as a result of heat conduction from the recording layer site upon which the laser beam is incident, and the formation of a dome in the overcoat layer over the pit, dome formation being caused by the pressure build-up of Eases produced by decomposition or degradation of the recording layer material as pit formation evolves.

The present invention seeks to provide an improved method of recording information and media for use with the improved method.

According to one aspect of the invention there is provided a method of recording information comprising providing an optical recording medium comprising a recording layer which absorbs radiation within a predetermined wavelength range, and an overcoat layer; and directing a laser beam of wavelength within said predetermined range through the overcoat layer so as to interact with the medium in such a way that a pit is formed in the recording layer and at least part of the overcoat layer locally overlying the pit is at least temporarily breached at the location of the pit.

Such interaction of the laser beam with the medium my involve displacement and/or removal of the overcoat material overlying the pit. Because the overcoat layer is breached during the formation of the pit, gases or vapours generated during pit formation are free to escape through the breach in the overcoat layer.

In practice, a plurality of pits are formed in the recording medium and are subsequently read back by interaction between a readback laser beam and the pits. Each pit is formed in the manner referred to in said one aspect of the invention.

Thus, in contrast with conventional wisdom, the method of the present invention involves breach of the overcoat layer by removal and/or displacement of the material thereof. This has been found to confer a number of advantages. Firstly, a medium which has been written in accordance with the method of the invention tends to give a more reliable read-out than is obtained when the overcoat layer is left intact as in conventional techniques. When media is written so that the overcoat layer is left intact, readback results often tend to be variable. It is believed that this variation is attributable to the gap that exists between the locally domed overcoat layer and the pit. The presence of the gap alters the optical properties of the medium and, although this in itself is not a problem, for reliable read-back the alteration in optical properties needs to remain substantially constant.

Our investigations reveal that the depth of the gap may vary in practice with consequent variation in optical properties. Such variation of the gap for instance may occur as a result of the read-back process itself. Although read-back is conventionally effected with a laser beam or beams having reduced power compared with the writing beam (in practice, the same laser beam my be used for both writing and reading but with the power levels adjusted), there is a limit to the extent of the reduction possible in power level since background noise becomes more prominent as the read-back power is reduced. Thus, even lower power levels may result in localised heating and softening of the overcoat layer over the pit being read and such heating can cause the dome to retract back towards the pit thereby reducing the dimension of the gap and hence altering the optical properties. The dimension of the gap may also change when the medium is subject to pressure or to temperature fluctuations. In the case of a tape medium which is stored in spooled form, the winding tensions result in considerable pressure between adjacent layers of the winding leading to variation in the gap depth.

Another advantage arises especially where a bilayer medium (i.e. one in which there is a reflective layer or layers underlying the recording layer so that the laser beam on traversing the recording layer undergoes reflection back through the recording layer) is used and the information is detected on read-back by reflectivity variation between written and unwritten regions of the medium. The presence of an overcoat modifies the reflectance versus thickness curve of the medium in a manner which reduces the contrast in reflectivity between the written and unwritten regions. In general, for overcoat thicknesses substantially less than the one quarter wavelength thickness (or an odd integral multiple thereof), contrast decreases as overcoat thickness increases. However, if the overcoat layer is removed or displaced locally during the writing process, greater contrast can be achieved since the measure of contrast is then between the reflectivity of the written, exposed regions and the unwritten, overcoated regions. It therefore becomes feasible for media used in accordance with the method of the invention to have thicker overcoats, and hence improved abrasion/scratch characteristics, than is the case where the conventional writing technique is employed, provided that the energy used in writing the pits is sufficient to expose the same.

A further advantage applicable to media intended to be read-back using reflectivity variation between the written and unwritten regions is reduced jitter since the absence of a gap between the pit and the overcoat eliminates the possibility of variations in this gap which otherwise tends to produce variations in the reflectivity versus thickness curve. For example, in the case of a bilayer medium in which the unwritten recording layer has a thickness corresponding to a point proximate a reflectivity maximum on the curve and in which the pits are written to a depth corresponding to a reflectivity minimum, the presence of a gap which varies in dimension leads to shifting of the reflectivity minimum which in turn produces increased jitter in the read-back signal.

According to a second aspect of the present invention there is provided an optical recording medium comprising a recording layer which absorbs radiation within a predetermined wavelength range and into which information pits can be written by means of a laser beam having a wavelength within said predetermined range, and an overcoat layer overlying the recording layer and through which the laser beam is transmitted, the overcoat layer being such that the energy content required of the laser beam in order to write a pit having a depth less than the thickness of the recording layer is sufficient to at least temporarily breach at least part of the overcoat layer locally overlying the pit.

In said one and/or said second aspect of the invention, it is preferred that the writing process should at least partially expose the pit permanently but we do not exclude the possibility that the pit may be only temporarily exposed as a result of breach of the overcoat layer but thereafter "resealed" as a result of flow of part of the displaced overcoat material back into the pit. In this event, rupture of the overcoat layer will allow the gases/vapours to escape so that the overcoat material that flows back into the pit and "reseals" it. Consequently, because the gases/vapours have been allowed to escape, there will be substantially no gap present between the pit and the overlying reduced thickness portion of overcoat material. Where such resealing takes place, the overcoat material that flows back into the pit will follow the pit contour thereby avoiding the creation of a gap between the recording layer and the overcoat layer. Also, the overcoat material which flows back may be of reduced thickness compared with the overcoat layer thickness in the unwritten areas of the medium.

The invention is particularly applicable to bilayer optical recording media.

Accordingly in another aspect of the invention there is provided an optical recording medium comprising a substrate, a reflective surface overlying or presented by the substrate, a layer of optical recording material which overlies the reflective layer and is absorbent to radiation within a predetermined wavelength range so that information pits can be written into the recording layer by means of a laser beam having a wavelength within said predetermined range, and an overcoat layer overlying the recording layer and through which the laser beam is transmitted, the reflective surface and the recording and overcoat layers forming an optical structure exhibiting a reflectance versus recording layer thickness curve having a first minimum and maximum reflectance values corresponding to thinner and thicker recording layer thicknesses respectively, the unwritten recording layer thickness of the medium corresponding to a thickness proximate the first reflectance maximum and the overcoat layer being such that the energy content required of the laser beam in order to write a pit having a depth corresponding to a recording layer thickness proximate said first minimum is sufficient to at least temporarily breach the overcoat layer locally overlying the pit.

Preferably the overcoat layer is highly transmissive with respect to radiation within said predetermined range. Usually removal and/or displacement of the overcoat layer will be the result of softening or melting of the overcoat layer by conduction of heat from the writing site on the recording layer coupled with the localised build up of pressure in this region resulting in rupture of the overcoat layer overlying the writing site end retraction of the overcoat material from the centre of the pit to form a rim at or adjacent the outer edge of the pit.

According to another aspect of the present invention there is provided an optical recording medium comprising a recording layer having information pits written therein, and an overcoat layer which overlies the recording layer and is locally perforated in register with each information pit.

According to yet another aspect of the present invention there is provided an optical recording medium comprising a recording layer having information pits written therein, and an overcoat layer which overlies the recording layer and is locally deformed in register with each information pit such that the overcoat material follows the pit contour without there being any intervening gap between the pit and overcoat layer.

Preferably the overcoat layer is of locally reduced thickness at locations where it overlies each pit.

Although it is preferred that the overcoat material should be highly transmissive, we do not exclude the possibility that it may be absorbing to some extent with respect to the writing wavelength so that the energy absorbed assists in the removal and/or displacement of the overcoat layer. For instance, the overcoat layer my comprise a substantially transmissive material incorporating an absorbing material such as a dye.

Desirably, the heat generated during pit formation is sufficient to secure softening of the overcoat layer substantially throughout its thickness since any unsoftened strata of the overcoat layer will tend to resist breaching thereof. Thus, the overcoat material will usually be one which has a suitable thermal diffusivity and thickness and which will soften or melt sufficiently to enable the overcoat layer to be breached during writing of information pits in the recording layer within the limited time interval of laser beam incidence on the desired site of writing (for example between $10^{-8}$ and $10^{-5}$ seconds and usually no greater than $10^{-6}$ seconds).

The overcoat layer is preferably composed of an organic material; such organic material may be a crosslinked plastics material which may be thermally or radiation curable. However, we do not exclude the possibility of using an overcoat layer composed of an inorganic material or a composite of an organic material and an inorganic material. Suitable materials for the overcoat layer will be readily apparent to the skilled man; examples include ultra violet or electron beam curable urethane acrylates, epoxy acrylates or polyester acrylates.

Said predetermined wavelength is typically within the range of 400 to 1,000 run, preferably 500 to 900 nm especially 600 to 850 nm.

The optical thickness of the overcoat layer will be considerably less than one half of the writing wavelength and will often be within the range of 1/50 to 1/5, more preferably 1/40 to 1/10 especially 1/25 to 1/10, of the writing wavelength. For example, in the case of a writing wavelength of 830 nm and an aromatic urethane acrylate overcoat, we have found that overcoat layers less than 80 nm thick, and more preferably between about 40 and 60 nm thick, are suitable.

The refractive index of the overcoat material is preferably between 1.4 and 2.2, more preferably between 1.4 and 1.7.

Preferably the recording layer is of the type which is thermally deformed to form optically readable pits when subject to heating by laser radiation of said given wavelength. Preferably the recording layer comprises a dye and polymer composition in which the dye may comprise the major constituent by weight.

Preferably the recording layer has optical constants such that the real part of the refractive index lies within the range 2.0 to 3.0 (more preferably 2.2 to 2.4) and the imaginary part of the refractive index lies within the range of 0.1 to 1.5 (more preferably 0.1 to 0.4). The first reflectance maximum of the unwritten recording medium is preferably in the range of 30 to 55%, more preferably 44% to 53% and the first reflectance minimum of the unwritten medium is preferably no greater than about 20%, more preferably no greater than about 15%. Advantageously, the difference between first minimum and maximum is at least about 25%, more preferably at least about 30%.

The optical recording medium my take any of the various forms used in the art; for example, it may be in the form of an optical disc (either of the rigid type of the floppy type) or in the form of a tape medium or card medium.

There may be a subbing layer between the substrate and the reflecting layer in order to screen out any debris, imperfections etc. that my be present on the surface of the substrate which carries the reflecting and other layers. The opposite surface of the substrate may be coated with a layer which is substantially impermeable to moisture.

The recording medium my include tracking formations which define zones in which information is intended to be recorded and which enable the laser beam to be maintained in registry with such zones during recording and reading of the optical element. Such zones my be at a different level with respect to the surrounding areas of the recording element to allow said zones to be optically distinguished from the remaining areas. In this event, the thickness of the overcoat layer may vary according to whether it is measured in the region of the zones or the remaining areas. It is therefore to be understood that the references above to the thickness of the overcoat and recording layers refer to the zones in which information is to be recorded.

For example, the tracking formations may, as is common practice in the art, be constituted either by a series of generally concentric grooves or a spiral groove with lands between the grooves or groove convolutions. The information to be recorded may be written either into the grooved zones of the element or the lands.

The invention will now be described by way of example only with reference to the accompanying drawings in which:

FIG. 2 is a graph showing diagrammatically the relationship between the reflectance of the recording element and the thickness of the recording layer for unovercoated and overcoated media;

Figure 1:
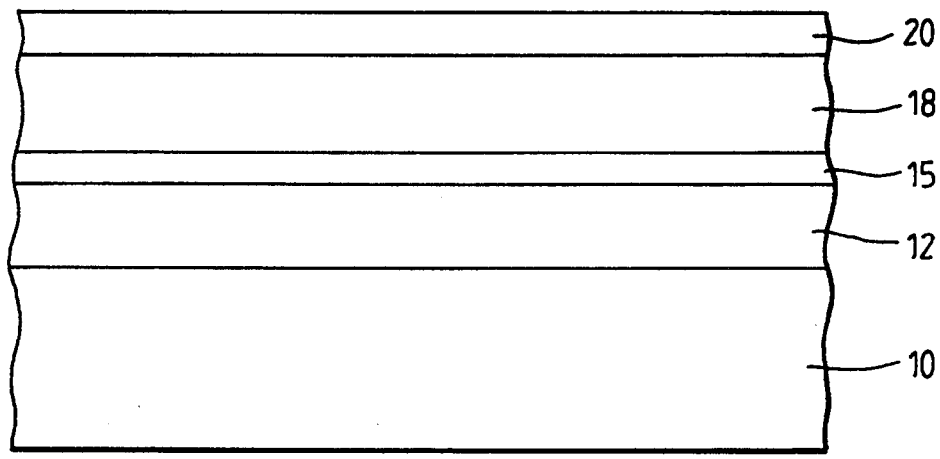
FIG. 1 is a schematic view in cross-section of an optical recording element to which the present invention is applicable.

Referring to FIG. 1, the optical recording medium illustrated is in a form suitable for use as a flexible optical tape. However, it will be appreciated that the present invention is not limited to media of the optical tape type. The medium comprises a flexible substrate 10 which is coated on one face with a subbing or smoothing layer 12, The reverse face of the substrate is typically coated with a backcoat (not shown) which may incorporate filler particles so as to impart a surface roughness to the reverse side of the substrate in order to control the frictional and handling properties of the medium. A thin layer 15 of material, e.g. a suitable metal, is applied to the smooth surface of the subbing layer 12 to provide a surface which is highly reflective with respect to the wavelength used for writing into and reading from the medium. An amorphous recording layer 18 of a dye combined with a thermoplastic binder is solvent coated over the reflecting layer 15. A number of suitable dyes for use in the recording layer 18 are disclosed in our prior U.S. Pat. No. 4,606,859. The binder is typically an amorphous polyester thermoplastic resin. An overcoat layer 20 is superimposed on the recording layer 18, the overcoat layer being of a material which is highly transmissive to the laser radiation used for writing and reading the medium and which will be compatible with the reverse surface of the substrate in terms of frictional and handling properties and my also serve to protect the recording layer from the environment and from damage by for example abrasion. The substrate 10 may comprise for example a 75 micron or less thick film of Melinex which is a biaxially orientated polyethylene teraphthalate film (Melinex is a Registered Trade Mark of Imperial Chemical Industries PLC) and has sufficient flexibility to function, when coated with the layers 12, 15, 18 and 20, as a flexible optical tape medium which my be wound up on a spool in a similar manner to magnetic tape media. The dye is selected so as to have an absorption peak slightly shifted away from the reading and writing wavelength, typically 830 nm. The overcoat layer is typically composed of tough and hard material such as a radiation cured urethane acrylate or epoxy acrylate.

The recording medium shown in FIG. 1 is intended to be written into and read back using conventional techniques involving moving the medium relative to an optical recording head operable in writing or reading modes using a laser beam adjusted to higher or lower power levels according to the mode of operation, recording being effected with increased power and read back with reduced power. The laser beam is focused onto the recording layer 18 through the overcoat layer 20. Information may be represented digitally by using pit length (i.e. the length of the pit in the direction of relative movement between the recording head and the medium) or pit position to store binary information and the information is read back by applying threshold techniques to detect the reflectivity changes produced by the pits.

The protective characteristics of the overcoat layer are at least to some extent dictated by the overcoat thickness, i.e. from the standpoint of protection, the thicker the overcoat layer the better the protection afforded especially against abrasion and scratching. Moreover, if the overcoat has an optical thickness of ½ of the writing wavelength, which is relatively thick, it is effectively invisible to the incident laser beam. However, thick overcoats suffer from the disadvantage that the recording sensitivity of the medium is poor since a significant proportion of energy input from the laser beam is required to deform the overcoat. In practice, it has been found feasible to adopt thinner overcoats in order to improve optical performance without detrimentally affecting the protective properties of the overcoat to an unacceptable extent. However, as referred to previously, while thin overcoats may be acceptable in terms of the properties required of overcoats, we have found that thin overcoats result in unacceptable variability in the recording characteristics of the written information if the medium is written according to conventional practice. In accordance with the present invention, this problem of variability is overcome by laser writing the information pits in such a way that the overcoat layer is perforated in register with each pit.

Referring to FIG. 2, there is shown a series of curves showing reflectance R of the optical structure (comprising the reflective layer, the recording layer and any overcoat layer present) versus recording layer thickness t. Curves A, B and C respectively represent the variation in reflectance in the case of a media which are: unovercoated; overcoated with a thin overcoat (e.g. 50 nm thick in the case of a laser writing beam of 830 nm) without any intervening air gap between the overcoat and recording layers; and overcoated with a thin overcoat of the same thickness as curve B but with an intervening air gap. It will be seen that in each case the reflectance curve has a first minimum and a first (non-zero thickness) maximum. In a typical embodiment, the recording layer thickness is selected so that the reflectance of the unwritten medium is proximate the first maximum, e.g. see point X1 on curve B.

Figure 3:
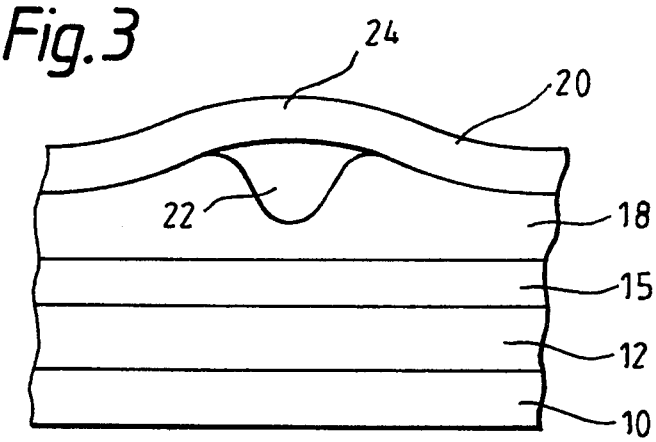
FIGS. 3 and 4 are views similar to FIG. 1 showing diagrammatically pit formation in accordance with the prior art and the present invention respectively.

Initially, prior to writing a pit at a particular site on the overcoated recording layer, the reflectance characteristics at that site are represented by curve B. The process of writing a pit into the recording layer however alters the reflectance characteristics. For instance if, as in the case of conventional practice, writing is accompanied by the formation of the overlying overcoat layer 20 into a dome 24 over the pit 22 as shown in FIG. 3, at that pit site the reflectance characteristics of the local optical structure are then represented by curve C. This is because the local optical structure comprises layers 15, 18, gap 26 between the pit and the domed overcoat, and the overcoat layer 20 itself. In practice, it is desirable to write pits to a depth corresponding to a dye layer thickness at which the reflectance curve is at or closely proximate the first minimum in order to obtain good contrast and reduce recording jitter. This can be achieved by using a laser beam of appropriate intensity. The result of writing a pit in accordance with conventional practice can be represented by point X2 on curve C.

It will be understood that if the gap varies in depth, as can occur in response to read damage or pressure as discussed previously, the local reflectance R will vary between the extremes represented by points X2 and X3, where X3 on curve B corresponds to the situation where the gap is reduced to zero, when for instance the dome 24 collapses into the pit. Such variation can lead to timing inaccuracies in read back of the pit since there uncertainties in the precise positions of the leading and trailing edges of the pits and threshold detection my be impaired, in some cases to the extent that a pit edge is not detected at all.

Figure 4:
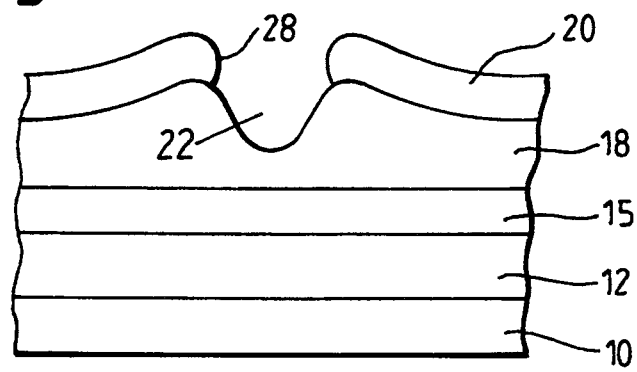

Referring to FIG. 4, the mechanism of writing pits in accordance with the invention is such that the overcoat layer is locally breached at the site of writing. This may be achieved by using a laser beam having a power level which generates sufficient heat for conduction to the overcoat layer that the latter can undergo local softening or melting and deformation to such an extent that it ruptures and then retracts to form a rim 28 around the pit 22. By locally removing the overcoat in this manner to expose the recording layer, the local optical structure then has reflectance characteristics as represented by curve A. In practice, the medium my be so designed that the energy needed to effect pit formation in the manner depicted in FIG. 4 is also effective to write pits having a depth corresponding to the point X4 on curve A.

The removal of the overcoat layer above each pit site allows the reflectance change to be increased, i.e. from X1 to X4 instead of from X1 to X2 (or some point between X2 and X3 if the gap between the pit and the overcoat varies as is possible when the overcoat is left intact over the pit) giving a higher contrast ratio. Because there is no gap present as in FIG. 3, the medium is not subject to reflectance variations as a result of read back or the application of pressure to the overcoat. In addition, recording jitter is improved because the reflectance minimum is only dependent on the optical constants of the recording layer, and not the less controlled thickness of the gap between the recording and overcoat layers.

EXAMPLE

An optical recording medium having for use in conjunction with a laser source of 830 nm wavelength was fabricated by spin coating a dye-binder formulation on to a reflective substrate. The substrate comprised a polyethylene terephthalate (Melinex—Registered Trade Mark of Imperial Chemicals Industries PLC) coated with an aluminium alloy of thickness of the order of 50 nm. The optical constants of the reflective aluminium alloy layer were: $n=2.74$ and $k=8.32$. The dye comprised pentadeca (naphth -2- ylthio) copper phthalocyanine, the preparation of which is disclosed in Example 33 of our prior U.S. Pat. No. 4,606,859, and the binder comprised VYLON 103 which is a commercially available saturated polyester resin. The proportion of dye to binder in the formulation was 3:1 and the dye-binder layer was coated to a thickness of about 130 run. The optical constants for the resulting dye-binder layer were: $n=2.3$ and $k=0.21$.

An overcoat layer transmissive to radiation of 830 nm wavelength was spin coated on to the dye binder layer, the overcoat material comprising an aromatic urethane acrylate (Ebecryl 220 and Ebecryl 210 combined in the ratio 3:1—Ebecryl 220 and 210 being commercially available from UCB) having a refractive index of about 1.5 and being coated to a thickness of about 40 run. The resulting optical structure had a first reflectance minimum of 10% (with the overcoat removed) and a first reflectance maximum of about 53% (with the overcoat intact. The thickness of the dye binder recording layer corresponded to a reflectance of 45%.

Using a laser beam having a wavelength of 830 nm, frequency of 3.75 MHz, duty cycle of 50%, a laser spot size of 1 micron, a laser-on time of 133 ns and a linear velocity (beam relative to medium) of 8.5 m/sec, it was found possible to write acceptable pits to the minumum reflectivity level with accompanying exposure of the pits by local removal of the overcoat with a laser energy of 2.1 nJ. Scanning electron microscopy revealed the pits to be exposed.

Figure 5:
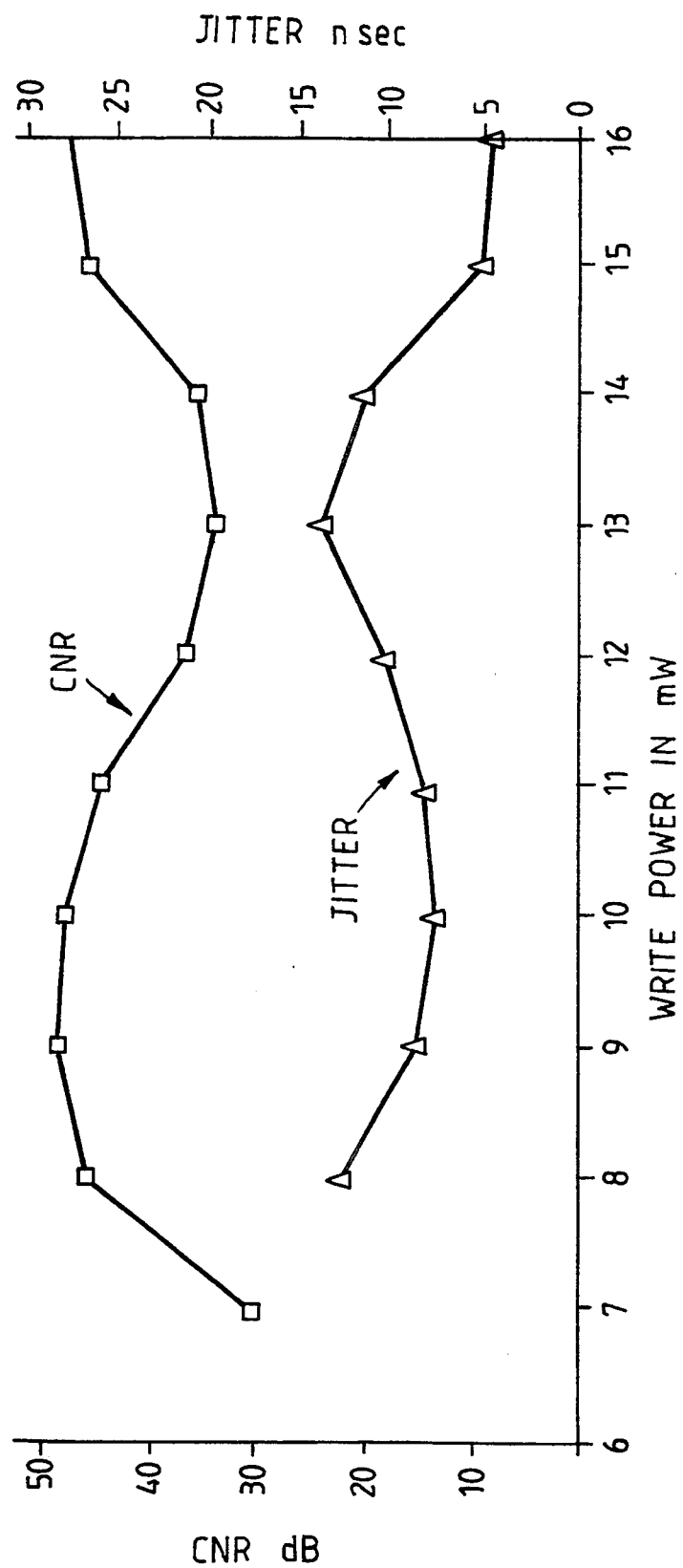
FIG. 5 is a graph showing the variation of CNR and jitter with laser writing power.

FIG. 5 illustrates the variation of carrier to noise ratio (CNR) and jitter with laser writing power for a medium produced in the above described manner with an overcoat thickness of about 40 nm. It will be seen from this data that a peak in CNR and minimum in jitter occurs at a laser power of about 9 to 10 mW. At this point, the overcoat is still intact and whilst the medium could be used to store information when written using a laser power of this magnitude, the medium is at this stage subject to the drawbacks previously discussed because of the presence of gaps between the pits and the overcoat layer. As the laser power is increased further beyond about 10 mW, CNR falls off and jitter increases. At about 12 to 13 mW, the overcoat is breached and as the power level approaches 16 mW, CNR increases to a maximum while jitter decreases to a minimum at a laser power of the order of 16 mW. This demonstrates that it is possible to write information with good CNR and jitter characteristics while breaching the overcoat so as to avoid gaps between the overcoat layer and the pits. It will be noted that the jitter at the writing power of 16 mW is lower than that at about 9 to 10 mW; jitter is a measure of the uniformity of pit formation and the data in FIG. 5 therefore indicates that more uniform pit formation can be achieved when pit formation is accompanied by localised breaching and retraction of the overcoat layer.

We claim:

1. An optical recording medium comprising a recording layer which absorbs radiation within a predetermined wavelength range and into which information pits can be written by means of a laser beam having a wavelength within said predetermined range, and an overcoat layer overlying the recording layer and through which the laser beam is transmitted, the overcoat layer being such that the energy content required of the laser beam in order to write a pit having a depth less than the thickness of the recording layer is sufficient to breach at least part of the overcoat layer locally overlying the pit.

2. A medium according to claim 1 in which the optical thickness of the overcoat layer is less than one half of the writing wavelength.

3. A medium according to claim 1 in which the refractive index of the overcoat material is between 1.4 and 2.2.

4. A medium according to claim 1 in which the recording layer has optical constants such that the real part of the refractive index lies within the range 2.0 to 3.0 and the imaginary part of the refractive index lies within the range of 0.1 to 1.5.

5. A medium according to claim 1 the difference between the first reflectance maximum of the unwritten recording medium and the first reflectance minimum of the unwritten medium is at least about 25%.

6. An optical recording medium comprising a substrate, a reflective surface overlying or presented by the substrate, a layer of optical recording material which overlies the reflective layer and is absorbent to radiation within a predetermined wavelength range so that information pits can be written into the recording layer by means of a laser beam having a wavelength within said predetermined range, and an overcoat layer overlying the recording layer and through which the laser beam is transmitted, the reflective surface and the recording and overcoat layers forming an optical structure exhibiting a reflectance versus recording layer thickness curve having a first minimum and maximum reflectance values corresponding to thinner and thicker recording layer thicknesses respectively, the unwritten recording layer thickness of the medium corresponding to a thickness proximate the first reflectance maximum and the overcoat layer being such that the energy content required of the laser beam in order to write a pit having a depth corresponding to a recording layer thickness proximate said first minimum is sufficient to at least temporarily breach the overcoat layer locally overlying the pit.

7. An optical recording medium comprising a recording layer having information pits written therein, and an overcoat layer which overlies the recording layer and is locally perforated in register with each information pit.

8. A medium according to any one of claim 1 to 7 in which the overcoat layer comprises an organic material.

9. A method of recording information comprising providing an optical recording medium comprising a recording layer which absorbs radiation within a predetermined wavelength range, and an overcoat layer; and directing a laser beam of wavelength within said predetermined range through the overcoat layer so as to interact with the medium in such a way that a pit is formed in the recording layer and at least part of the overcoat layer locally overlying the pit is breached at the location of the pit.

* * * * *